Patented Feb. 25, 1941

UNITED STATES PATENT OFFICE 2,232,855

PROCESS FOR THE MANUFACTURE OF ADIPIC ACIDS

Heinrich Hopff and Wilhelm Rapp, Ludwigshafen-on-the-Rhine, Germany, assignors to I. G. Farbenindustrie Aktiengesellschaft, Frankfort-on-the-Main, Germany No Drawing. Application January 30, 1940, Serial No. 316,360. In Germany January 4, 1939

9 Claims. (Cl. 260—537)

The present invention relates to a process for the manufacture of adipic acids.

We have found that hexahydroacetophenone, its homologues, for example methyl-, dimethyl-, ethyl- or propyl-hexahydroacetophenone, or its substitution products, for example chloro-, bromo- or dichlorohexahydroacetophenone, may be converted into adipic acids in a rapid and simple manner while giving a very good yield by subjecting the initial material to an oxidizing treatment with nitric acid. The concentration of the nitric acid depends on the temperature employed, but must be at least 10 per cent. In the case of dilute nitric acid, the reaction must be carried out at higher temperatures, say 80° C. and more, and under pressure, if required.

It is advantageous to use nitric acid of 40 per cent strength and more working at a temperature of between about 40 and 80° C. without the application of pressure. Generally it is sufficient to heat to from 50 to 60° C. while using concentrated nitric acid, for example such of 50 per cent strength, in which case oxidation occurs forthwith being completed after a short time, nitrous gases being evolved. Upon allowing the reaction mixture to cool, adipic acid separates almost in quantity.

The oxidation may be promoted by catalysts, for example small proportions of alkali metal or ammonium salts of vanadic or molybdic acid.

Hexahydroacetophenone, as employed as an initial substance in the instant application, may be obtained by hydrogenating tetrahydroacetophenone, readily obtainable according to the copending application Ser. No. 274,040 in the name of Heinrich Hopff and Curt W. Rautenstrauch, by the condensation of butadiene with vinylmethylketone. The corresponding methyl derivative for instance may be prepared by the same method from isoprene and vinylmethylketone, the chloroderivative from 2-chlorbutadiene and methylvinylketone.

The following examples serve to illustrate how the present invention may be carried out in practice, but the invention is not restricted to the said examples. The parts are by weight.

Example 1

126 parts of hexahydroacetophenone are slowly run, while agitating well, into 440 parts of 50 per cent nitric acid containing 0.2 part of ammonium vanadate, in the course of from 2 to 3 hours at a temperature of between 55° and 60° C. The temperature is maintained by outside cooling and appropriately proportioning the addition of the hexahydroacetophenone. The whole of hexahydroacetophenone having been introduced, agitating is continued for another hour on a water bath at 60° C. The mixture is then cooled down to about zero degree and the liquid filtered off by suction from the adipic acid separated out.

In a similar manner methylhexahydroacetophenone may be converted into methyladipic acid or chloro-hexahydroacetophenone into chloradipic acid.

Example 2

340 parts of 4,5-dimethylhexahydroacetophenone (obtainable by hydrogenating the condensation product from 2,3-dimethylbutadiene and vinylmethylketone) are rapidly run, with vigorous agitation, into 1385 parts of 65 per cent nitric acid containing 0.5 part of ammonium vanadate so that the temperature does not rise above 70° C. The addition of the ketone being complete, stirring of the mixture is continued for another 2 hours while maintaining a temperature of 70° C. by heating on the waterbath. Any excess of nitric acid is blown off by means of steam and the solution then concentrated in vacuo into a thick sirup. The non-crystallized 2,3-dimethyladipic acid may be purified in the form of its ethylester boiling between 160° and 165° C. under a pressure of 16 millimeters.

What we claim is:

1. The process of producing adipic acids, which comprises subjecting a hexahydroacetophenone to an oxidizing treatment with nitric acid.
2. The process of producing adipic acids, which comprises subjecting a homologue of hexahydroacetophenone to an oxidizing treatment with nitric acid.
3. The process of producing adipic acids, which comprises subjecting a substitution product of hexahydroacetophenone to an oxidizing treatment with nitric acid.
4. The process of producing adipic acids, which comprises subjecting a hexahydroacetophenone to an oxidizing treatment with nitric acid of at least 40 per cent strength.
5. The process of producing adipic acids, which comprises subjecting a hexahydroacetophenone to an oxidizing treatment with nitric acid in the presence of an oxidation catalyst.
6. The process of producing adipic acids, which comprises subjecting a hexahydroacetophenone to an oxidizing treatment with nitric acid in the presence of ammonium vanadate as a catalyst.
7. The process of producing adipic acid by subjecting hexahydroacetophenone to an oxidizing treatment with nitric acid.
8. The process of producing a chloroadipic acid by subjecting a chlorohexahydroacetophenone to an oxidizing treatment with nitric acid.
9. The process of producing 2,3-dimethyladipic acid by subjecting 4,5-dimethylhexahydroacetophenone to an oxidizing treatment with nitric acid.

HEINRICH HOPFF.
WILHELM RAPP.